3,281,417
PRODUCTION OF DITHIAZINE COMPOUNDS
Manfred Beck, Litzelstetten (Bodensee), and Hans Wagner, Konstanz (Bodensee), Germany, assignors to Deutsche Gold- und Silber-Scheideanstalt vormals Roessler, Frankfurt am Main, Germany
No Drawing. Filed June 22, 1964, Ser. No. 377,047
Claims priority, application Germany, Dec. 29, 1961, D 37,789; June 26, 1963, D 41,840
3 Claims. (Cl. 260—243)

This is a continuation-in-part of application Serial No. 247,296, filed December 26, 1962, now abandoned.

The present invention relates to an improved process for the production of dithiazine compounds of the formula

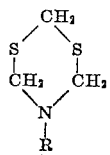

in which R is alkyl, preferably, lower alkyl, aryl, preferably, phenyl or naphthyl, alkaryl, aralkyl, preferably, lower alkaryl or lower alkyl of the benzene and naphthalene series, cycloalkyl or heterocyclic radicals which if desired can be substituted by one or more hydroxyl, hydroxy lower alkyl, lower alkoxy alkyl, carboxyl, N-dihydrodithiazinyl, —$R^1SO_3X$ or —$R^2SO_4X$ groups in which $R^1$ is alkylene or arylene, preferably, lower alkylene or phenylene, $R^2$ is alkylene, preferably, lower alkylene, and X is hydrogen or alkali metal.

It is known that such dithiazine compounds of this type can be prepared by reacting equimolecular quantities of formaldehyde, a primary amine and hydrogen sulfide in an acid or neutral medium. In addition, dithiazines can be prepared by reacting N-methylene amines with $H_2S$ in alcoholic-aqueous solutions. With this procedure thiazetidines and thiadiazines substituted at the nitrogen atom are produced in addition to the desired dithiazines so that the yield of the desired product is relatively low and as a rule impure end products are obtained (von Wohl, "Berichte der Deutschen Chemischen Gesellschaft," Vol 19, 1886, page 234).

According to the invention it was unexpectedly found that dithiazines of the above general formula can be simply and easily prepared by reacting formaldehyde or a compound yielding formaldehyde and a primary amine of the formula $H_2NR$ with an alkali metal hydrogen sulfide.

The formaldehyde yielding substances which may be employed according to the invention in place of formaldehyde, for example, are the lower polymers of formaldehyde, such as, paraformaldehyde.

Examples of suitable primary amines for the reaction according to the invention are: lower alkyl amines, such as, methyl amine, ethyl amine, isopropyl amine, or propanol amine, glycine, alanine, serine, glutamic acid, aspartic acid, β-alanine, γ-amino butyric acid, ξ-amino caproic acid, 11-amino undecanoic acid, p-amino phenol, phenyl ethyl amine, naphthyl amine, cyclohexyl amine, allyl amine, furfuryl amine, o-amino benzozic acid and ethylene diamine.

Expediently the starting materials are reacted in the presence of a solvent such as water or aqueous lower alkanols. Non-aqueous alkanols, such as, for example, methanol, can also be employed.

The reaction can be carried out at around room temperature but it also can be carried out at lower or higher temperatures. It is expedient to employ an excess of formaldehyde and of alkali metal hydrogen sulfide. In most reactions it is of no consequence in what order the starting substances are combined and as a result difficulties which could occur through poor solubility of the starting substances or end products are easily avoided.

The dithiazine compounds which can be prepared by the process of the invention, some of which are new, are useful as pesticides, such as, for example, fungicides and bactericides, and have also been found to be non-phytotoxic and particularly useful as nematocides. For example, N-i-propyl-dihydro-1,3,5-dithiazine is effective against Meloidgyne incognita at a concentration of <500 p.p.m. in the water test and a concentration of <50 p.p.m. in a soil test. The corresponding effective concentrations for d,1-2 - (dihydro - 1,3,5-dithiazino)-propionic acid are <500 p.p.m. and <100 p.p.m. Against Heterodera restochiensis the first mentioned compound is effective at concentrations of <<50 p.p.m.

The following examples will serve to illustrate the invention with reference to a number of specific embodiments thereof.

Example 1

120 cc. of a 25.8% aqueous methyl amine solution were added to 600 cc. of an aqueous 35% formaldehyde solution at room temperature. The resulting clear solution was then added dropwise at 20° C. to a solution of 140 g. of 95% NaSH in 200 cc. of water. After a little while the reaction product began to crystallize out. The reaction mixture was stirred for 24 hours and then cooled to 5° C. and the N-methyl dihydro-1,3,5-dithiazine crystals filtered off on a suction filter. The yield was 123 g. which is 92.5% of the theoretical. The melting point of such product was 62–64° C. The thus obtained already rather pure product was recrystallized from methanol/water to produce a product having a melting point of 65–66° C.

Example 2

The procedure of Example 1 was repeated but instead of using room temperature (20° C.) for the reaction a temperature of 50° C. was employed. Practically the same yields were obtained.

Example 3

60 g. of glycine were dissolved in 450 cc. of 30% aqueous formaldehyde and 100 g. of 95% NaSH dissolved in 200 cc. of water added dropwise thereto at 20° C. After addition of the NaSH the reaction mixture was permitted to react for a further 5 hours during which time the temperature rose up to a peak 30° C. Thereafter enough water (about 400 cc.) was added that the precipitated sodium salt dissolved and the resulting cloudy solution filtered. Then 110 cc. of concentrated HCl were added to the filtrate to precipitate the acid. A pH of 4 was attained in the solution. After cooling to +5° C. the precipitated crystals were filtered off and dried under vacuum. 139 g. of dihydro-1,3,5-dithiazinyl acetic acid which is 90% of the theoretical were obtained. The compound was recrystallized from methanol and after processing the mother liquor 165 g. of the product or 92.2% of the theoretical were obtained with a melting point of 169–170° C.

Example 4

78 cc. of concentrated HCl were added dropwise to a solution of 260 g. of $Na_2S \cdot 9H_2O$ (92%) in 200 cc. of water while cooling. A solution of 37.5 g. of glycine in 225 cc. of a 30% aqueous solution of formaldehyde was then added dropwise to the NaSH solution produced. The reaction mixture was permitted to stand for 20 hours at room temperature and then clarified by filtering. Then 67 cc. of concentrated HCl were added while cooling. After cooling the reaction mixture down in an ice box it was filtered and the precipitate dried under vacuum. After recrystallization from methanol, 63.5 g. of 71.0% of the theoretical of the same purified product as in Example 3 were obtained.

*Example 5*

90 g. of paraformaldehyde were dissolved in 300 cc. of methanol with the addition of 40 cc. of a 50% NaOH solution and 37.5 g. of glycine added thereto. The resulting solution was then added dropwise to a solution of 60 g. of NaSH in 80 cc. of water at 20° C. The resulting mixture was then permitted to react while stirring for 12 hours. The precipitated sodium salt was then filtered off, dissolved in 350 cc. of water and reprecipitated with concentrated HCl. After cooling to 5° C. the precipitate was filtered off. Yield=41.5 g. of dihydro-1,3,5-dithiazinyl acetic acid.

*Example 6*

A solution of 44.5 g. of d,l-α-alanine in 150 cc. of 30% formaldehyde and 150 cc. of water was added dropwise to a solution of 60 g. of NaSH in 100 cc. of water while cooling to 20° C. The reaction mixture was then heated to 50° C. for 30 minutes. After cooling down the reaction mixture was filtered, the pH thereof adjusted to 4 with concentrated HCl and cooled to +4° C. The precipitate was filtered off, washed and dried under vacuum. 78.5 g. of a crude product of the compound

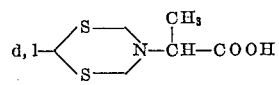

were obtained. Upon recrystallization from methanol, 58.8 g. of the product with a melting point of 147° C. were obtained. Yield=61% of the theoretical.

*Example 7*

A solution of 44.5 g. of β-alanine in 300 cc. of 30% formaldehyde were added dropwise to a solution of 60 g. of NaSH in 100 cc. of water at 20° C. After 4 hours' stirring 100 cc. of water were added, the mixture filtered and the pH of the filtrate adjusted to 4 with concentrated HCl. The precipitated product was filtered off, washed and dried under vacuum. 81 g. of the crude product of the compound

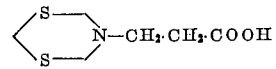

were obtained. Upon recrystallization from methanol, 57.5 g. of the pure product with a melting point of 131° C. were obtained. Yield=59.6% of the theoretical.

*Example 8*

300 cc. of 30% formaldehyde were added to a solution of 15 g. of ethylene diamine in 30 cc. of water. A solution of 60 g. of NaSH (94%) in 120 cc. of water were then run into the mixture. The resulting precipitate was filtered off after 3 hours' stirring, washed and dried. 61 g. or 91% of the theoretical of the crude product of the compound

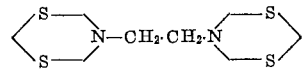

were obtained. After recrystallization from methyl glycol acetate, 55 g. of the pure product were obtained. Yield=82% of the theoretical.

*Example 9*

A mixture of 61 g. of ethanol amine with 300 cc. of 30% formaldehyde was run into a solution of 120 g. of NaSH in 120 cc. of water at 20° C. During a period of several hours a heavy gray oil separated off which was taken up in ethyl acetate. After the ethyl acetate solution was dried, HCl gas was introduced and the precipitated hydrochloride of the dithiazinyl ethanol filtered off and dried under vacuum. The yield was 144.5 g. or 72% of the theoretical. The product was recrystallized from methanol and a little water and then had a melting point of 179° C. The free base in crystalline form with a melting point of 49° C. was obtained by decomposing the hydrochloride, extraction with $CH_2Cl_2$, washing with water, drying and evaporating the organic phase to dryness.

*Example 10*

A mixture of 52.5 g. of d,l-serine, 300 cc. of 30% formaldehyde and sufficient 2 N NaOH that complete solution occurred was run into a solution of 60 g. of NaSH in 60 cc. of water. After some time, precipitation of the sodium salt of the compound

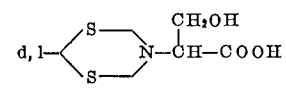

began and the mixture was stirred for a further 5 hours and sufficient water added to effect complete solution. The pH of the solution was adjusted to 4 with concentrated HCl and after cooling down to 4° C. the precipitated acid filtered off, washed and dried under vacuum. 71.0 g. or 68% of the theoretical of the product with a melting point of 154–155° C. were obtained.

*Example 11*

220 cc. of 30% formaldehyde were added at 15° C. to a solution of 60 g. of NaSH in 100 cc. of water and immediately thereafter a suspension of 54.5 g. of p-amino phenol in 200 cc. of water added dropwise. After about 1 hour's stirring the temperature rose to about 30° C. Stirring was continued for a total of 6 hours and the mixture then cooled to 0° C. The precipitated dihydrate of the sodium salt of the compound

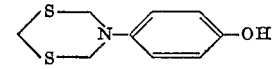

was filtered off. 110 g. (81.2% of the theoretical) of the almost colorless substance were obtained. The free phenol was obtained after solution in water and precipitation with acetic acid.

*Example 12*

A mixture of 68.5 g. of o-amino benzoic acid, 200 cc. of water, 30 cc. of 50% NaOH and 150 cc. of 30% formaldehyde was added dropwise while cooling to a solution of 60 g. of NaSH in 100 cc. of water. After permitting the mixture to react for a further 4 hours, it was clarified with active carbon and the compound

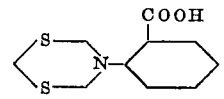

precipitated out with concentrated HCl. The moist product obtained after filtering on a suction filter was recrystallized from ethanol. 63 g. (52.3% of the theoretical) of a light yellow product of a melting point of 163° C. were obtained.

*Example 13*

A mixture of 600 cc. of 30% formaldehyde and 105 cc. of ethyl amine (50%) was added dropwise at 50° C. to a solution of 140 g. of 95% sodium hydrogen sulfide (NaSH) in 150 cc. of water. After stirring the reaction mixture for 12 hours at room temperature, the oily base was taken up in methylene chloride, washed twice with water, dried and the hydrochloride of the base precipitated with isopropanolic HCl.

142 g. of the compound

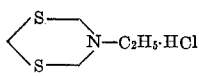

were obtained. After recrystallization from methanol, 121 g. (65.3% of the theoretical) of the purified product with a melting point of 201° C. were obtained.

*Example 14*

A mixture of 93 cc. of 70% isopropyl amine and 600 cc. of 30% formaldehyde was added dropwise at 50° C. to a solution of 140 g. of NaSH (95%) in 150 cc. of water. After stirring the reaction mixture for 12 hours the oil which separated was taken up in methylene chloride, washed twice with water, dried and the solvent distilled off under vacuum. The residue solidified in crystalline form. 132 g. of the compound

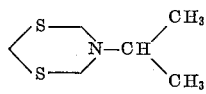

of a melting point of 42° C. were obtained. The yield was 81% of the theoretical.

*Example 15*

4 mol of 30% aqueous formaldehyde were added to 1 mol of NaSH dissolved in 150 cc. of water. Then ½ mol of n-propyl amine was added dropwise to the mixture. After several hours the mixture was extracted with methylene chloride. Upon drying such extract and distilling off the solvent, 135 g. of N-n-propyl-1,3,5-dihydrodithiazine (83.8% of theory) were obtained as a colorless oil.

N-n-butyl - 1,3,5 - dihydrodithiazine and N - isobutyl-1,3,5-dihydrodithiazine were produced analogously in yields which respectively were 73.5% and 69% of theory.

*Example 16*

2.2 mol of 30% aqueous formaldehyde were mixed with 0.5 mol of furfuryl amine and subsequently 1 mol of NaSH dissolved in 60 cc. of water were run in. The mixture was permitted to react for several hours and then extracted with methylene chloride. 71 g. of N-furfuryl-1,3,5-dihydrodithiazine were recovered from such extract as an oil (yield 70.5% of theory).

*Example 17*

0.1 mol of 2-amino-naphthalene-5-sulfonic acid was converted to the sodium salt in 50 cc. of water with dilute NaOH. The reaction mixture of 0.24 mol of NaSH and 0.45 mol of aqueous 30% formaldehyde was then added thereto dropwise. The reaction mixture was stirred over night at room temperature and then cooled down. The 2 - (1,3,5-dihydrodithiazino)-naphthylene-5-sulfonic acid was recovered in the form of its sodium salt in a 60% yield. Upon acidification the free salt was obtained.

*Example 18*

3 mol of aqueous 30% formaldehyde solution were added to 1 mol of NaSH dissolved in 150 cc. of water while cooling. Subsequently 0.5 mol of allyl amine was added dropwise and the mixture heated to 60° C. whereupon the temperature continued to rise to 75° C. After the reaction mixture had cooled down it was extracted twice, each time with 100 cc. of methylene chloride, and the extract was washed twice, each time with 100 cc. of water. After drying the extract over Na$_2$SO$_4$ and distilling off the solvent 78 g. of N-allyl-1,3,5-dihydrodithiazine were obtained.

*Example 19*

3 mol of aqueous 30% formaldehyde solution were added to 1 mol of NaSH dissolved in 150 cc. of water while cooling. Subsequently 0.5 mol of phenyl ethyl amine was added to such mixture. An exothermic reaction occurred. After it had subsided and the reaction mixture had cooled to room temperature it was extracted twice, each time with 150 cc. of methylene chloride. The extract was washed with water, dried and the solvent distilled off. 102 g. of phenyl ethyl dihydrodithiazine were obtained. The hydrochloride was prepared by treating a methylene chloride solution of the free base with isopropanolic HCl.

*Analysis.*—Calculated: N, 5.35%; S, 24.5%; Cl, 13.6%. Found: N, 5.25%; S, 24.8%; Cl, 13.2%.

*Example 20*

49.5 g. (0.5 mol) of cyclohexyl amine were added to 1 mol of NaSH dissolved in 150 cc. of water and 2 mol of aqueous 30% formaldehyde added dropwise while stirring at 15–20° C. Upon processing the reaction mixture as in Example 19, 79 g. of N-cyclohexyl-1,3,5-dihydrodithiazine were obtained. After it was recrystallized from alcohol its analysis was:

Calculated: N, 6.90%; S, 31.50%. Found: N, 6.85%; S, 31.45%.

*Example 21*

56 g. of NaSH (1 mol) were dissolved in 80 cc. of water. Then 230 cc. of 39 vol. percent aqueous formaldehyde solution were added dropwise to such solution at 15–20° C. 20 minutes after such addition a solution containing 0.5 mol of taurine as the sodium salt was added rapidly. The temperature rose to 30–34° C. The solution was then stirred for a further ten hours at room temperature. The precipitated reaction product was filtered off. 99.5 g. of the monohydrate of sodium-2-(5,6 - dihydro - 1,3,5 - dithiazine)ethane sulfonate of the formula

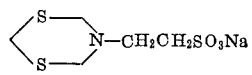

were obtained.

*Analysis.*—Calculated: N, 5.2%, Sulfate ash calculated as Na$_2$SO$_4$, 26.4%. Found: N, 5.16%, Sulfate ash calculated as Na$_2$SO$_4$, 26.7.

*Example 22*

56 g. of NaSH (1 mol) were dissolved in 80 cc. of water. Then 230 cc. of 39 vol. percent aqueous formaldehyde solution were added dropwise to such solution at 15–20° C. 20 minutes after such addition 40 g. (0.5 mol) of methoxy propylamine were added thereto. The temperature of the reaction mixture rose in a few minutes from 20° C. to 30–35° C. The reaction was then stirred over night at room temperature and the oily upper phase extracted with methylene chloride. After drying with Na$_2$SO$_4$ HCl gas was introduced into the extract while cooling. The hydrochloride of N-methoxy propyl-5,6-dihydro-1,3,5-dithiazine which precipitated out was filtered off and dried. Yield=74.8 g. Melting point= 129–130° C.

*Analysis.*—Calculated: S, 27.9%; Cl, 15.4%. Found: S, 28.3%; Cl, 14.9%.

*Example 23*

28 g. NaSH (0.5 mol) were dissolved in 40 cc. of water and to such solution 228 cc. of 39.5 vol percent aqueous formaldehyde were added at a maximum temperature of 20° C. After a further reaction period of 15 minutes, a solution of 35.2 g. (0.25 mol) of β amino ethyl sulfuric acid in the equivalent quantity of 25% NaOH was added dropwise thereto. The temperature rose to 24–26° C. The reaction mixture was stirred over night and subsequently a portion of the water was distilled off under vacuum. After cooling in an ice box the precipitate was filtered off and then recrystallized from isopropanol/water.

The yield of sodium β-(5,6-dihydro-1,3,5-dithiazino) ethyl sulfate was 37.4 g. N=4.88, sulfate ash=26.2%.

We claim:
1. In a process for the production of a dithiazine compound of the formula

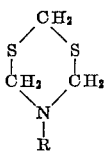

wherein R is selected from the group consisting of alkyl, cycloalkyl, aryl, alkaryl, aralkyl and heterocyclic radicals and such radicals carrying at least one substituent selected from the group consisting of hydroxy, hydroxy alkyl, alkoxy alkyl, carboxy, N-dihydrodithiazinyl, —R$^1$SO$_3$X and —R$^2$SO$_4$X in which R$^1$ is selected from the group consisting of alkylene and arlyene, R$^2$ is alkylene and X is selected from the group consisting of hydrogen and alkali metal by reacting an aldehyde substance selected from the group consisting of formaldehyde and lower polymers of formaldehyde capable of yielding formaldehyde and a divalent sulfur compound with a primary amine of the formula H$_2$NR reactive with H$_2$S and said aldehyde substance to produce said dithiazine compound, the step of reacting said aldehyde compound and said primary amine with an alkali metal hydrogen sulfide as said divalent sulfur compound, the molar ratio of said alkali metal hydrogen sulfide to said primary amine being at least 2:1.

2. The process of claim 1 in which said reaction is carried out in contact with at least one substance selected from the group consisting of water and lower alkanols.

3. The process of claim 1 in which said alkali metal hydrogen sulfide is NaSH.

References Cited by the Examiner
UNITED STATES PATENTS 2,273,664   2/1942   Searle _____ 260—243 XR

OTHER REFERENCES

Braymore, "J. Chem. Soc. (London)," 1935, pages 865–866.

WALTER A. MODANCE, *Primary Examiner.*

NICHOLAS S. RIZZO, *Examiner.*

M. W. WESTERN, J. M. FORD, *Assistant Examiners.*